(12) United States Patent
Neuhold

(10) Patent No.: US 10,049,786 B2
(45) Date of Patent: Aug. 14, 2018

(54) ELECTRIC ENERGY TRANSMISSION TETHER FOR AN AIRBORNE WIND POWER STATION

(71) Applicant: Stefan Neuhold, Lostorf (CH)

(72) Inventor: Stefan Neuhold, Lostorf (CH)

(*) Notice: Subject to any disclaimer, the term of this patent is extended or adjusted under 35 U.S.C. 154(b) by 0 days.

(21) Appl. No.: 15/520,665

(22) PCT Filed: Oct. 21, 2015

(86) PCT No.: PCT/EP2015/074296
§ 371 (c)(1),
(2) Date: Apr. 20, 2017

(87) PCT Pub. No.: WO2016/062735
PCT Pub. Date: Apr. 28, 2016

(65) Prior Publication Data
US 2017/0316850 A1    Nov. 2, 2017

(30) Foreign Application Priority Data

Oct. 21, 2014 (EP) .................................. 14189788

(51) Int. Cl.
| H01B 7/04 | (2006.01) |
| H01B 9/00 | (2006.01) |
| H01B 7/02 | (2006.01) |
| H01B 7/18 | (2006.01) |
| H02K 7/18 | (2006.01) |
| H02G 11/02 | (2006.01) |

(52) U.S. Cl.
CPC ............... *H01B 7/043* (2013.01); *H01B 7/02* (2013.01); *H01B 7/18* (2013.01); *H01B 9/005* (2013.01); *H02G 11/02* (2013.01); *H02K 7/183* (2013.01)

(58) Field of Classification Search
CPC . H01B 7/043; H01B 7/02; H01B 7/18; H01B 9/005; H02G 11/02; H02K 7/183
USPC .............................................. 174/70 R, 70 C
See application file for complete search history.

(56) References Cited

U.S. PATENT DOCUMENTS

| 2,759,990 A | 8/1956 | Bean |
| 4,116,153 A | 9/1978 | Fisher et al. |
| 4,514,058 A | 4/1985 | Walton |
| 4,975,543 A | 12/1990 | Saunders |
| 5,042,903 A * | 8/1991 | Jakubowski ......... G02B 6/4415 385/101 |

(Continued)

FOREIGN PATENT DOCUMENTS

| CN | 200972799 Y | 11/2007 |
| FR | 1348475 | 11/1962 |

(Continued)

*Primary Examiner* — Timothy Thompson
*Assistant Examiner* — Charles Pizzuto
(74) *Attorney, Agent, or Firm* — The Webb Law Firm

(57) ABSTRACT

An electric energy transmission tether for an airborne wind power station comprises an elastic core, a first layer of one or more electric conductors helically wound around the elastic core, an electric insulation layer surrounding the first layer of electric conductors, a second layer of one or more electric conductors helically wound around the electric insulation layer, and a load bearing layer surrounding the second layer of electric conductors, for absorbing tensile forces and radial pressure forces acting on the tether.

20 Claims, 8 Drawing Sheets

(56) References Cited

U.S. PATENT DOCUMENTS

| | | | |
|---|---|---|---|
| 2010/0101833 A1* | 4/2010 | Zachariades | B32B 5/26 |
| | | | 174/136 |
| 2011/0132660 A1* | 6/2011 | Struwe | D04C 1/12 |
| | | | 174/74 A |
| 2012/0070122 A1* | 3/2012 | Lind | F03D 5/00 |
| | | | 385/103 |
| 2013/0207397 A1 | 8/2013 | Bosman et al. | |
| 2014/0262428 A1* | 9/2014 | Broughton, Jr. | H01B 7/043 |
| | | | 174/116 |
| 2016/0056621 A1* | 2/2016 | Patten | F03D 1/02 |
| | | | 174/40 R |

FOREIGN PATENT DOCUMENTS

| | | |
|---|---|---|
| WO | 2009049616 A2 | 4/2009 |
| WO | 2012013659 A1 | 2/2012 |

* cited by examiner

ELECTRIC ENERGY TRANSMISSION TETHER FOR AN AIRBORNE WIND POWER STATION

CROSS-REFERENCE TO RELATED APPLICATIONS

This application is the United States national phase of International Application No. PCT/EP2015/074296 filed Oct. 21, 2015, and claims priority to European Patent Application No. 14189788.4 filed Oct. 21, 2014, the disclosures of which are hereby incorporated in their entirety by reference.

BACKGROUND OF THE INVENTION

Field of the Invention

The present invention concerns an electric energy transmission tether for an airborne wind power station. The electric energy transmission tether serves to transmit electric energy from an airborne wind power station to a ground station and to absorb tensile forces caused by the airborne wind power station during operation. The present invention also concerns a tether unit comprising such an electric energy transmission tether and a drum for winding up the tether, and the invention furthermore concerns a power unit with an airborne wind power station, a ground station and such an electric energy transmission tether for connecting the wind power station to the ground station.

Description of Related Art

For the conversion of wind energy into electrical energy, airborne wind power stations are known and are increasingly being developed. Airborne wind power stations comprise one or more electric generators being mounted on a flying object which usually has an airplane-like construction. The propeller equipped generators are driven by wind and by special flight manoeuvres, in order to produce electric energy. The electric energy is transferred to the ground by means of tethers which connect the airborne wind power station to a ground based station. The tethers thus serve partially to control the flight movements of the airborne wind power station and to transmit electric energy from the generators to the ground. To bring the airborne wind power station from the ground station into an optimal position in the air for energy production or to retrieve it from a position in the air back to the ground station, the electric generators can be used as electric motors. In these start and retrieving phases of the operation, electric energy is thus fed from the ground station to the airborne wind power station by means of one or more tethers.

Due to strong and often changing winds and during certain flight manoeuvres, the tethers are exposed to high mechanical tensile stress with varying amplitude. The tethers can show a significant elongation of more than 1% of their original length under high load conditions. The material of the electric conductors, such as copper, being present within the tethers, however, shows a very low elastic range of approximately 0.1%. Therefore, even in case of relatively small elongations, conventional electric conductors will plastically and irreversibly deform. After a subsequent decrease of the axial tension of the tethers, the deformed electric conductors tend to buckle and to break.

The tethers are also exposed to mechanical stress, when being wound up on a drum in the ground station during the retrieving phase. Bending a tether to the peripheral outer surface of a drum causes compression to the parts of the tether facing the centre of the drum and tension to the parts facing radially outwardly. As a consequence, the mechanical stress caused by winding up the tether onto a drum can also lead to plastic deformation of the electric conductors being provided within the tether.

A tether for physically and electrically coupling an airborne wind power station to the ground is shown in US 2012/0070122 A1. The tether comprises a high strength core around which the electric conductors are helically wound. This construction, however, results in a tether being relatively thick and heavy. As a consequence, the weight and the wind resistance of the tether are likely to influence the flight characteristics of the airborne wind power station and, therefore, especially reduce the overall power production efficiency. Moreover, a thick and heavy construction of the tether leads to higher weight on the tether drum resulting in an increased inertia and therefore slower tension regulation. Further disadvantages are increased transportation costs as well as to a more cost-intensive and more spacious construction of the ground station. Furthermore, when being wound up on a drum, the conductors lying on the outside of the high strength core are insufficiently protected against radial compression forces which will lead to plastic deformation and failure. High radial compression forces between the core and the surface of the drum can not only be caused due to the bend of the tether around the drum, but also due to high tensile forces acting on the tether because of heavy wind conditions or special flight manoeuvres.

In WO 2009/049616 A2, a cable is disclosed in which a chemical fibre rope is braided around two mutually insulated layers of electric conductors. The chemical fibre rope serves to protect the cable against tensile forces and radial compression forces. However, when being spooled on a drum, a significant deformation of the cross-sectional area of the cable towards an oval shape still occurs due to the high radial forces. Additionally, the high number of axial load changes in the application of airborne wind power stations leads to a significantly shortened life time of the cable. Due to these reasons, additional measures against radial compression forces need to be implemented, in order to achieve a sufficient fatigue life.

Further electric energy transmission cables that are both elastic and able to resist tensile forces to a certain degree are disclosed in U.S. Pat. No. 4,116,153, U.S. Pat. No. 4,975,543, U.S. Pat. No. 2,759,990 and U.S. Pat. No. 4,514,058.

SUMMARY OF THE INVENTION

It is an object of the present invention to provide an electric energy transmission tether for an airborne wind power station, which is not only able to resist high tensile forces and has a lightweight construction, but which is also well protected against external radial forces.

In order to achieve this object, the present invention provides an electric energy transmission tether for an airborne wind power station, comprising
an elastic core;
a first layer of one or more electric conductors helically wound around the elastic core;
an electric insulation layer surrounding the first layer of electric conductors;
a second layer of one or more electric conductors helically wound around the electric insulation layer; and a load bearing layer surrounding the second layer of electric conductors, for absorbing tensile forces as well as radial compression forces acting on the tether.

The tether serves to couple the airborne wind power station to the ground both physically and electrically. In other words, the tether is adapted to resist the tensile forces caused by the wind acting onto the airborne wind power station as well as to transmit electric energy from the wind power station to the ground and, preferably, vice versa.

The load bearing layer serves to absorb the tensile forces acting on the tether and, owing to its tensile stiffness, limits the axial elongation of the tether induced by strong winds and specific flight manoeuvres of the wind power station. The load bearing layer thus defines the maximal axial elongation of the tether under the maximally to be expected tensile load. By arranging the load bearing layer as much as possible radially outside on the tether, and particularly radially outside of the electric conductors, the cross-sectional area of the load bearing layer is maximized due to its large circumferential length. Put differently, for achieving a certain tensile strength of the tether, the radius of the tether taken up by the load bearing layer can be minimized with the arrangement as proposed. Furthermore, the layers of the electric conductors and of the insulation can be arranged closer to the longitudinal centre axis of the tether, such that the circumferential length of these layers is minimized, which further reduces the weight of the tether. Thus, the overall weight and diameter of the tether can be optimized by arranging the load bearing layer radially outside of the electric conductors. By arranging the electric conductors and the insulation layer closer to the longitudinal centre axis, the tension and compression forces acting on them in case of the tether being bent are reduced. Advantageously, the load bearing layer even represents the outermost layer of the tether, with the exception of an additional wear protection layer possibly being present. Due to its arrangement radially outside of the electric conductor layers and of the insulation layer, the load bearing layer also protects these layers from external radial compression, e.g. when the tether is spooled on a drum and is axially tensioned due to heavy winds.

The airborne wind power station is usually designed as a plane-like flying object with an airfoil on which one or more electric generators are attached. The electric generators are driven by means of propellers, in order to produce electric energy. The electric energy produced by the generators can be in the low- (up to 1 kV) or lower part of the medium-voltage range (1 kV to 52 kV). In order to save weight and decrease the diameter of the tether, the voltage level can, however, be transformed up to the medium- (1 kV to 52 kV) or high-voltage (52 kV to 300 kV) range, especially for a transferred electric power of above 1 MW. Thus, the tether can be adapted to these voltages in certain embodiments. Instead of a plane-like configuration, the wind power station could of course also be designed as a captive balloon, an airship or as any other flying object.

The tether further comprises a first semi-conductive layer arranged between the first layer of electric conductors and the electric insulation layer and preferably also a second semi-conductive layer arranged between the electric insulation layer and the second layer of electric conductors. The semi-conductive layers, which can be made of semi conductive polyethylene for example, serve to provide a well-defined, smooth surface to the insulation layer, in order to achieve a homogeneous electric field between the two layers of electric conductors. Thus, the semi-conductive layers help to overcome electric insulation problems particularly for medium- and high-voltage appliances. Usually for these applications, the entire insulation system comprising the semi-conductive layer on the conductor, the electrical insulation layer and the semi-conductive layer on the electrical insulation layer are applied in a closely arranged 3-stage co-extrusion process. Of course, the construction of a medium- or high-voltage electric transmission tether without any semi-conductive layers is also possible. However, in order to achieve a sufficiently homogeneous electric field in such a case without any semi-conductive layers, usually an insulation layer with a relatively large thickness needs to be provided. Thus, the provision of the semi-conductive layers also helps to reduce the overall diameter and weight of the tether.

The load bearing layer comprises a compression resistant layer for absorbing radial compression forces and a tensile armour layer for absorbing tensile forces. Thus, the load bearing layer comprises two sublayers with one of them being specifically adapted to absorb radial compression forces and the other one being specifically adapted to absorb tensile forces.

The elastic core, the first and second layers of electric conductors, the insulation layer and the load bearing layer are preferably circular in cross section and usually have a constant shape and area in cross section over the entire length of the tether. Preferably, each of the layers has an essentially cylindrical shape and is concentrically arranged around the longitudinal centre axis of the tether. Advantageously, each of the layers takes up a certain, well-defined radial range along the radial direction of the tether. The electric conductors are usually realized by metallic wires, in particular copper wires or aluminium wires.

In order to achieve a high tensile stiffness and also radial stiffness, the load bearing layer can be reinforced with elongated elements, such as fibres, which are preferably helically wound around the outermost, i.e. usually the second, layer of electric conductors. The load bearing layer is preferably made of a fibre reinforced material, particularly a fibre reinforced plastic material, such as polymer matrix composite (PMC) or a fibre reinforced thermosetting polymer with e.g. an epoxy resin matrix material. Also epoxy resin with rubber addition, for example carboxyl-terminated butadiene-acrylonitrile random copolymer (CTBN) modified epoxy resin matrix material can be used for improving the flexibility of the fibre composite material. The fibres can for example be carbon fibres, glass fibres or aramid fibres, possibly with an epoxy resin or thermoplastic matrix material, and can be arranged in parallel to the longitudinal centre axis of the tether or be helically wound around the outermost, i.e. usually the second, layer of electric conductors. An inclined arrangement of the fibres relative to the longitudinal centre axis of the tether and particularly a helical winding contributes to the radial stiffness of the load bearing layer. If the weight restrictions allow a higher weight, also e.g. high strength steel can be used for the elongated elements of the load bearing layer in combination with e.g. an elastomere matrix. The load bearing layer can be designed in different ways depending on the specific requirements of the application.

For example a lightweight, relatively stiff design of the load bearing layer with good resistance to radial compression, which is especially suitable for small diameters of the tether, can be achieved in a way that the fibres are helically wound around the outermost, usually the second, layer of electric conductors. There can be two or more layers with unidirectional fibre orientation of the same helical pitch angle in each layer, but wound in opposing directions. For an increased tensile stiffness they can e.g. be braided. The braiding of the fibres can be biaxial or triaxial. Braids with different helical pitch angles of the fibres can be applied in subsequent layers for the optimization of the mechanical properties of the load bearing layer. When being inclined relative to the longitudinal centre axis and particularly when being helically wound, the pitch angles of the fibres relative to the longitudinal centre axis are preferably between 35° and 90°, more preferably between 45° and 75° (and/or between −35° and −90°, more preferably between −45° and −75° in the case of a layer wound in an opposing direction), in order to achieve good radial compression protection. Of course, combinations of these laying techniques and/or several fibre layers with different pitch angles can also be applied. The matrix material can for example be polyethylene (PE), polyphenylene sulfide (PPS) or polyetheretherketone (PEEK); of course also epoxy resin can be used as matrix material. In order to save weight, the load bearing layer is advantageously non-metallic.

To achieve a load bearing layer with a lower bending stiffness than the one indicated above allowing e.g. a smaller drum diameter, the load bearing layer can also be implemented in the form of two concentric layers of circularly arranged tensile armour elements. These tensile armour elements are preferably helically arranged around the longitudinal centre axis of the tether with a pitch angle in the range of +/−65° to +/−85°. They can be made of a composite material, e.g. of pulltruded carbon fibre wires with epoxy resin or thermoplastic matrix material or, if the weight restrictions allow a higher weight, also of e.g. high strength steel. Instead of tensile armour elements, tensile armour profiles with a higher filling factor than the tensile armour elements can be used. The tensile armour profiles are also preferably arranged around the longitudinal centre axis of the tether with a pitch angle in the range of +/−65° to +/−85°.

Under axial strain of the tether, the helically applied tensile armour elements will usually induce a compressive force to the inner parts of the tether. Therefore, an elastic buffer layer consisting of a soft material, for example silicon elastomere, depolymerized rubber or polyurethane can be provided, in order to homogenize the radial compressive forces acting on the outermost electric conductor layer. This will help to avoid plastic deformation and the danger of buckling and breaking of the electric wires in the electric conductor layer.

The load bearing layer can also be implemented in the form of two layers of tensile armour composite layer. A tensile armour composite layer is advantageously made of a composite material with unidirectional fibre orientation. The fibres are preferably helically arranged around the longitudinal axis of the tether with a pitch angle in the range of +/−65° to +/−85°. The change of the winding direction from one layer to the other, e.g. the fibres of one layer are wound in clockwise direction and the fibres of the other layer are wound in the counter clockwise direction, helps to mechanically balance the torsional behaviour of the tether under axial strain. Between the two tensile armour layers, a slip/antifriction layer can be provided. Of course, multiple layers of tensile armour elements or tensile armour profiles or tensile armour composite layers can be provided depending on the axial load requirements of the tether.

In order to achieve a sufficient electric power transmission capability in the case of a very large airborne wind power station, a large diameter of the tether is required. With the approach described above, the increased axial forces acting on the tether, which result in increased radial compression forces, can lead to an increased degradation of the electric conductors. To optimize the bending radius limits towards the high tensile load requirements in combination with the protection of the electric system against high radial compression forces, the load bearing layer can also be provided with a compression resistant layer in combination with a slip/antifriction layer and a tensile armour layer.

The compression resistant layer can be made of an electrically conductive material, such as a metal, in order to carry electric current as an additional part of the electric system and/or to also act as a lightning protection layer. Of course, the compression resistant layer can also be made of an electrically non-conductive material.

The compression resistant layer can be implemented in the form of an s-shaped interlocked compression resistant carcass. The individual elongated elements with the s-shaped profile used in the s-shaped interlocked compression resistant layer are preferably helically arranged around the longitudinal axis of the tether 3 with a pitch angle in the range of 1° to 20°, more preferably in the range of 5° to 10°. The compression resistant layer can also be made e.g. of z-shaped, T-shaped, slanted or flat axial elongated, helically wound elements. They can be made of a composite material, e.g. of pulltruded carbon fibre or, if the weight restrictions allow a higher weight, also of e.g. high strength steel. The compression resistant layer can also be made of a composite material with unidirectional fibre orientation. The fibres are preferably helically arranged around the longitudinal axis of the tether 3 with a pitch angle in the range of 1° to 20°, more preferably of 5° to 10°. The composite compression resistant layer can for example be made of carbon, glass or aramid fibres in an epoxy resin or thermoplastic matrix.

Between the load bearing layer and the electric system preferably a slip/antifriction layer is provided. Also between the load bearing layer and the wear protection layer a slip/antifriction layer can be provided. These slip/antifriction layers help to enable a small bending radius of the entire tether 3 due to the unbonded state of the different layers. The slip/antifriction layers can for example consist of a thermoplastic material like nylon 11 (PA11) or fluoropolymers like polytetrafluorethylene (PTFE).

The tensile armour layer can be implemented in the form of two layers of helically arranged tensile armour elements separated from each other by a slip/antifriction layer. These tensile armour elements are preferably helically arranged around the longitudinal axis of the tether 3 with a pitch angle in the range of +/−35 to +/−65°. They can be made of a composite material, e.g. of pulltruded carbon fibre wires or, if the weight restrictions allow a higher weight, also of e.g. high strength steel.

The change of the winding direction from one layer to the other, e.g. the fibres of one layer are wound in clockwise direction and the fibres of the other layer are wound in the counter clockwise direction helps to mechanically balance the torsional behaviour of the tether under axial strain. Between the two tensile armour layers, a slip/antifriction layer can be implemented. According to the tensile strength requirements of the tether, further sublayers of tensile armour elements can be provided.

The tensile armour layer can also be provided in the form of two layers of tensile armour composite layers which can be separated from each other by a slip/antifriction layer. The tensile armour composite layers are preferably made of a composite material with unidirectional fibre orientation. The fibres are preferably helically arranged around the longitudinal axis of the tether with a pitch angle in the range of +/−35° to +/−65°. The same arrangement considerations concerning clockwise respective counter clockwise orientation can also be applied for the tensile armour composite layers as for the tensile armour elements, in order to get symmetrically equalized mechanical characteristics of the tether 3. The tensile armour composite layers can for example be made of carbon, glass or aramid fibres in an epoxy resin or thermoplastic matrix. The slip/antifriction layer can for example be made of a thermoplastic material like nylon 11 (PA11) or fluoropolymers like polytetrafluorethylene (PTFE).

The electric insulation layer being radially arranged between the two layers of electric conductors is advantageously applied in an extrusion process. Suitable materials are for example polyethylene (PE), polypropylene (PP) or high temperature resistant materials of the group of the fluoropolymers like polyvinylidenfluorid (PVDF) or tetrafluorethylene/hexafluorpropylene-copolymer (Teflon® FEP). For some applications, the electric insulation layer may also be provided as a foil which can be made for example of PVDF or Teflon® FEP.

Preferably, the electric conductors of the first layer of electric conductors and/or the electric conductors of the second layer of electric conductors are wound around the longitudinal centre axis of the tether with a helical pitch angle in the region between 25° and 45°, more preferably between 30° and 40°, and most preferably of about 35°. With a helical pitch angle in these ranges, the mechanical stress acting on the electric conductors, the insulation layer and the elastic core is minimized, because the helically wound electric conductors and the elastic core together with the electric insulation layer show essentially the same radial contraction/expansion, if the tether is axially elongated or bent.

The individual electric conductors of the first layer and/or the individual electric conductors of the second layer can in each case be helically wound such, that they are all aligned in parallel to each other. Preferred, however, is an embodiment, in which the first layer of electric conductors and/or the second layer of electric conductors is formed by braided wires. Thus, the electric conductors in this case form a regular, intertwined structure.

The electric conductors of the first layer can be wound in opposite directions around the longitudinal centre axis of the tether as compared to the electric conductors of the second layer. The first layer of electric conductors and/or the second layer of electric conductors can each comprise several adjacent sublayers of helically wound wires. The wires of adjacent sublayers are advantageously wound in opposite directions. Thus, the pitch angles of the wires of adjacent sublayers in this case differ from each other by their algebraic signs. By winding the wires of the first and the second layers and/or of the adjacent sublayers in opposite directions, the mechanical characteristics of the tether can be symmetrically equalized.

With respect to the longitudinal direction of the tether, the load bearing layer usually has a tensile stiffness that is greater than the overall effective tensile stiffness of the elastic core, of the first and the second layer of electric conductors and of the electric insulation layer together. The tensile stiffness of an elongated element, such as the tether or a layer, is here defined as the product of the elastic modulus or Young's modulus of the element's material along the longitudinal direction of the element and the cross-sectional area of the element. Thus, the tensile stiffness indicates the resistance of the respective element against elastic deformation due to a tensile load. By having a tensile stiffness that is greater than the overall tensile stiffness of the rest of the layers of the tether taken together, the load bearing layer limits the maximal strain exposure for the other layers. When being subjected to a tensile force or when being bent for example around a drum, the mechanical stress due to elastic elongation, bending and torsion are absorbed by the load bearing layer to a great extent. The electric conductors, the elastic core and the insulation layer basically only move with the load bearing layer without being subjected to any critical mechanical stress.

In some embodiments, the tether additionally comprises at least one data transmission cable being advantageously arranged within the elastic core. The elastic core in this case preferably has a hollow or cylindrical design. The data transmission cable preferably is a fibre optic cable.

In some embodiments, a moisture barrier and/or a slip layer is provided between the outermost, i.e. usually the second, layer of electric conductors and the load bearing layer. The two functions of slip and humidity blocking can for some materials particularly be achieved by a single layer that provides the gliding property and forms a moisture barrier, e.g. polyamide 11 (PA11) or specific fluoropolymers (like polytetrafluorethylene (PTFE) or polyvinylidenfluoride (PVDF)). It is also possible to have two layers for these purposes, i.e. a humidity blocking layer being applied on the outermost layer of electric conductors and a slip layer being applied between the humidity blocking layer and the load bearing layer. In order to have a good interlocking to the electric conductor layer, the humidity blocking/combined slip and humidity blocking layer can be extruded on the electric conductor layer. Alternatively or additionally, an adhesion layer and/or buffer layer can also be provided between the outermost layer of electric conductors and the load bearing layer.

For protecting the load bearing layer for example against friction or against sunlight, a wear protection layer surrounding the load bearing layer can be provided. In order to reduce the wind resistance of the tether, the wear protection layer can have a structured outer surface, e.g. with small spherical dents that can have a size in the millimeter range, similar to a golf ball surface.

The invention also provides a tether unit comprising a tether as indicated and a drum for winding up the tether. The drum can for example be used for storing the tether, if the wind power station is not in its operational state, or it can be used for accommodating a part of the tether length, if, during operation of the wind power station, the tether is not fully unreeled. The drum can be part of a ground station of a power unit that additionally comprises an airborne wind power station and a tether as indicated. The tether unit can have two separate drums with different sizes for the same tether. The first drum can be used for road transportation and has a minimal diameter according to the bending radius limit of the tether, in order to avoid transport problems when passing road passages with size limits, like bridges or tunnels. The second drum can be used for the service operation of the tether in combination with the airborne wind power station and the ground station with a larger diameter optimized for low fatigue of the tether materials.

If the tether has a first outer radius and the drum comprises a peripheral surface for accommodating the tether with a second outer radius, the ratio of the first outer radius of the tether relative to the second outer radius of the drum's peripheral surface is preferably at least 0.3% and not more than 2%, more preferably at least 0.5% and not more than 1.5% for a load bearing layer being made of two or more composite layers with unidirectional fibre orientation or for a load bearing layer being made of one or more braided composite layers. For a load bearing layer being made of concentric layers of circular arranged tensile armour elements or tensile armour profiles or tensile armour composite layers or for a load bearing layer being made of a compression resistant layer in combination with a slip/antifriction layer and a tensile armour layer, the ratio of the first outer radius of the tether relative to the second outer radius of the drum's peripheral surface is preferably at least 0.3% and not more than 5%, more preferably at least 0.5% and not more than 3%. With such a ratio of the outer radius of the tether to the outer radius of the drum, the drum is dimensioned such, that on the one hand the mechanical stress to which the tether is subjected when being wound up on the drum is not too high, and that on the other hand the size of the drum is minimized.

Furthermore, the invention provides a power unit comprising an airborne wind power station, a ground station and at least one tether as indicated. The tether serves to connect the airborne wind power station to the ground station both physically and electrically.

BRIEF DESCRIPTION OF THE DRAWINGS

Preferred embodiments of the invention are described in the following with reference to the drawings, which only serve for illustration purposes, but have no limiting effects. In the drawings it is shown.

DESCRIPTION OF THE INVENTION

Figure 1:
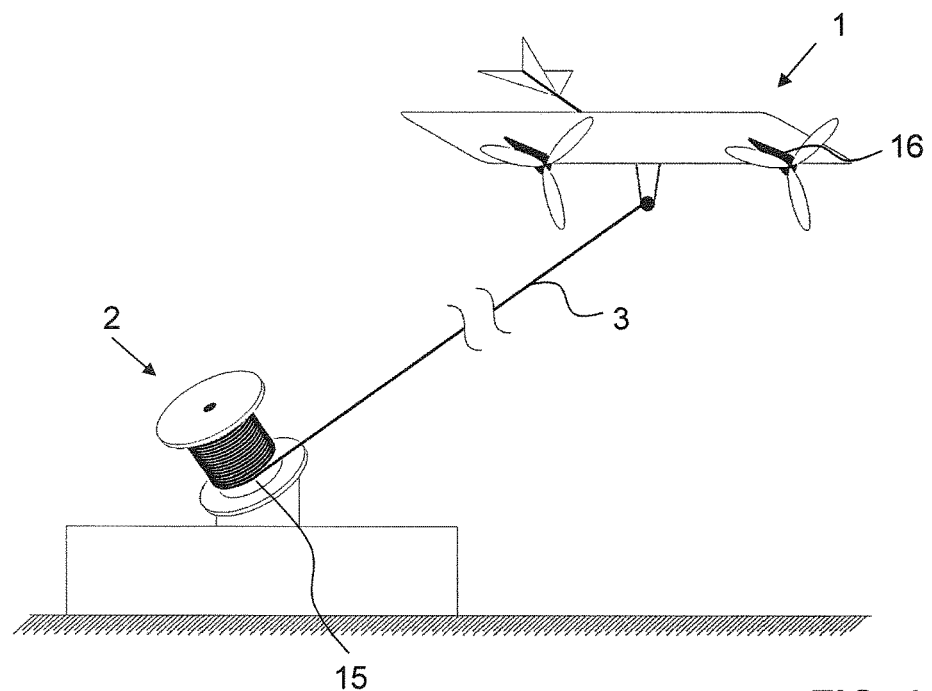
FIG. 1 schematically shows a power unit with an airborne wind power station, a ground station and an electric energy transmission tether according to the invention.

FIG. 1 shows a power unit with an airborne wind power station 1 being connected to a ground station 2 by means of a single electric energy transmission tether 3. Of course, it would also be possible to provide more than one electric energy transmission tether 3 for connecting the airborne wind power station 1 to the ground station 2.

The electric energy transmission tether 3 serves to couple the airborne wind power station 1 to the ground both physically and electrically. Thus, the tether 3 needs to be able to resist tensile forces caused by the wind acting onto the airborne wind power station 1 and caused by direction changes of the airborne wind power station 1 due to special flight manoeuvres. The tensile forces, which often vary strongly over short time periods, cause the tether 3, in comparison to its unloaded condition, to longitudinally stretch and, as a consequence, to radially contract.

In the ground station 2, a part of the tether 3 is wound onto a drum 15 during the operational state of the wind power station 1 as shown in FIG. 1. The drum 15 is used for accommodating a part of the tether 3 during the start and retrieving phases of the airborne wind power station 1 and during its normal operational state if not the maximal length of the tether 3 is used. The drum 15 can also be used for transportation purposes. If the transportation route from the fabrication location of the tether 3 to the installation location requires a smaller drum diameter, also a smaller drum can be applied which fulfils the requirements for the minimal bending radius of the tether 3.

Due to the bending of the tether 3 along the peripheral outer surface of the drum 15, a certain compression of the parts of the tether 3 facing the centre of the drum 15 and a certain tension of the parts facing radially away of the drum 15 occur. Due to the bending of the tether 3 along the peripheral outer surface of the drum 15, also a compression of the tether 3 in the radial direction of the drum 15 occurs, such that the part of the tether 3 being wound onto the drum 15 usually has a slightly oval cross-section.

The airborne wind power station 1 comprises an airfoil on which one or more electric generators 16 are attached. The electric generators 16 are each driven by a propeller, in order to produce electric energy. Preferably, the electric generators 16 can also be used as motors, in order to drive the propellers e.g. during start and retrieving phases of the airborne wind power station 1. The electric energy produced by the electric generators 16 in the normal operational state of the wind power station 1 as well as the electric energy consumed by the electric generators 16 when being used as motors are transferred between the wind power station 1 and the ground station 2 and vice versa by means of the tether 3. Additionally, the flight movements of the airborne wind power station 1 can be controlled by the drag on the tether 3 regulated by the drive system of the drum 15.

The controlling of the flight movements of the wind power station 1 by means of e.g. corresponding actions of the propellers or of rudders can be achieved wirelessly by the provision of corresponding wireless signal transmission units on the wind power station 1 and the ground station 2 or by a wired signal connection between the wind power station 1 and the ground station 2. In case of a wired signal connection, metallic signal wires or, preferably, fibre optic cables can be provided within the tether 3 for this purpose.

Figure 2:
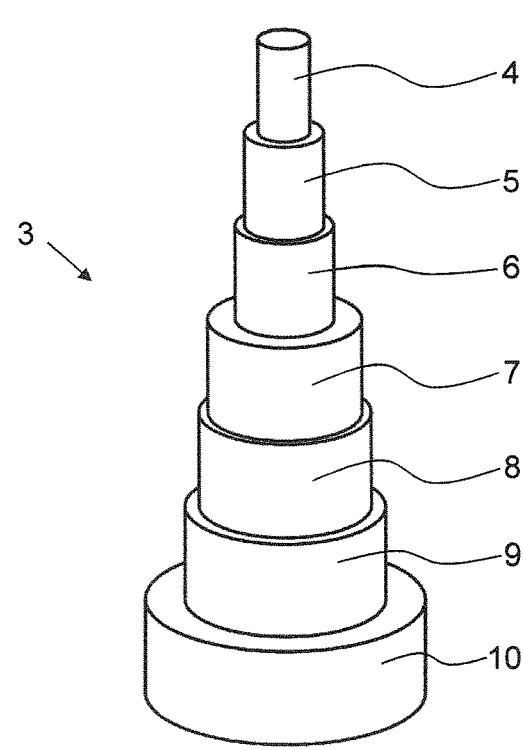
FIG. 2 shows the construction of a first embodiment of an inventive electric energy transmission tether, in a perspective view.

FIG. 2 shows the internal structure of a first embodiment of an inventive electric energy transmission tether 3. The tether 3 has a multi-layer construction with several layers 4-10, each of them having a circular cross-section. Each layer 4-10 extends along the entire longitudinal length of the tether 3 with constant cross-section.

In the centre of the tether 3, an elastic core 4 is provided being made of an elastic, non-metallic material, typically an elastomer, such as ethylene-propylene-terpolymere-rubber (EPDM), nitrile-rubber (NBR) or silicone-elastomer. Also thermoplastic materials, for example polyethylene (PE) with a suitable elasticity in the range of 3% or more, can be applied. The elastic core 4 has a Young's modulus in the region of 1 N/mm$^2$ to 100 N/mm$^2$ for elastomers and up to approx. 4000 N/mm$^2$ for thermoplastic materials.

Since the tether 3 represents the only connection of the airborne wind power station 1 to the ground, an earth-potential free transmission of electric energy needs to be achieved by means of the tether 3. As a consequence, the tether 3 comprises at least two layers of electric conductors 5, 9 being separated from each other by means of an electric insulation layer 7. Between the two layers of electric conductors 5, 9 an electromagnetic field can be established, in order to transmit electric energy from the wind power station 1 to the ground station 2 (or vice versa).

While the first layer of electric conductors in the form of metallic wires 5 is directly wound onto and around the elastic core 4, the second layer of electric conductors in the form of metallic wires 9 is wound around the electric insulation layer 7. In order to achieve a certain elasticity of the electric transmission system formed here by layers 5, 7 and 9, each of the metallic wires 5 and 9 are helically or spirally wound along the longitudinal direction of the elastic core 4 or of the electric insulation layer 7, respectively. The individual metallic wires 5 and 9 which are arranged in the same layer 5 or 9 of the tether 3 are usually not electrically isolated against each other. The metallic wires 5 and 9 are preferably made of copper.

The electric insulation layer 7 being radially arranged between the two layers of electric conductors 5, 9 is advantageously applied in an extrusion process. Suitable materials are for example polyethylene (PE), polypropylene (PP) or high temperature resistant materials of the group of the fluoropolymers like polyvinylidenfluoride (PVDF) or tetrafluorethylene/hexafluorpropylene-copolymer (Teflon® FEP). For some applications with an electric system voltage of only a few kilovolts, the electric insulation layer 7 may be also be provided as a wrapped foil which can be made for example of PVDF or Teflon® FEP.

On both sides of the insulation layer 7 along the radial direction of the tether 3, a semi-conductive layer 6, 8 is provided. The first semi-conductive layer 6 is arranged between the first layer of metallic wires 5 and the insulation layer 7, and the second semi-conductive layer 8 is provided between the insulation layer 7 and the second layer of metallic wires 9. By means of the semi-conductive layers 6 and 8 featuring a minimal surface roughness, which can for example be made of semi-conductive polyethylene, a geometrically well-defined homogenous electrical field can be achieved.

In order to absorb the tensile forces acting onto the tether 3 during operation of the airborne wind power station 1, a load bearing layer 10 is provided. In order to achieve a high tensile stiffness and also radial stiffness, the load bearing layer 10 can comprise elongated elements, such as fibres, helically wound around the outermost layer of electric conductors 9. The load bearing layer 10 surrounds the second layer of metallic wires 9 and, thus, represents the radially outermost layer of the tether 3. The load bearing layer 10 protects the inner layers 5, 6, 7, 8, 9 against axial and non-axial loads and limits the maximal strain exposure for these layers. Depending on the selected specific embodiment of the load bearing layer 10, the load bearing layer 10 has Young's modulus in the axial direction of the tether 3 in the region of 20'000 N/mm$^2$ to 200'000 N/mm$^2$, preferably in the region of 60'000 N/mm$^2$ to 160'000 N/mm$^2$. The load bearing layer 10 is preferably made of a fibre reinforced material, particularly a fibre reinforced plastic material, such as polymer matrix composite (PMC) or a fibre reinforced thermosetting polymer with e.g. an epoxy resin matrix material. Also epoxy resin with rubber addition for example carboxyl-terminated butadiene-acrylonitrile random copolymer (CTBN) modified epoxy resin matrix material can be used for improving the flexibility of the fibre composite material. The fibres can for example be carbon fibres, glass fibres or aramid fibres, possibly with an epoxy resin or thermoplastic matrix material, and can be arranged in parallel to the longitudinal centre axis of the tether 3 or be helically wound around the outermost layer of electric conductors, which is here represented by the second layer of electric conductors 9. An inclined arrangement of the fibres relative to the longitudinal centre axis of the tether 3 and particularly a helical winding contributes to the radial stiffness of the load bearing layer 10. If the weight restrictions allow a higher weight, also e.g. high strength steel can be used for the elongated elements of the load bearing layer 10.

It is possible also to provide a wear protection layer between the metallic wires 9 and the load bearing layer 10, especially when the load bearing layer 10 is made of a metallic material, such as steel. The use of a non-metallic material for the load bearing layer, however, is preferred, in order to save weight.

The design of the load bearing layer 10 can be chosen in different ways depending on the specific requirements of the application. For example a lightweight, relatively stiff embodiment of the load bearing layer 10 with good resistance to radial compression, especially suitable for small diameters of the tether 3, can be chosen in a way that the fibres are helically wound around the outermost layer of electric conductors 9. There can be two or more layers with unidirectional fibre orientation of the same helical pitch angle, but wound in opposing directions. For an increased tensile stiffness they can e.g. be braided. The braiding of the fibres can be biaxial or triaxial. Braids with different helical pitch angles of the fibres can be applied in subsequent layers for the optimization of the mechanical properties of the load bearing layer 10. When being inclined relative to the longitudinal centre axis and particularly when being helically wound, the pitch angles of the fibres are preferably between +/−35° and +/−90°, more preferably between +/−45° and +/−75°, in order to achieve good radial compression protection. Of course, combinations of these laying techniques and/or several fibre layers with different pitch angles can also be applied. The matrix material can for example be polyethylene (PE), polyphenylene sulfide (PPS) or polyetheretherketone (PEEK); of course also epoxy resin can be used as matrix material. In order to save weight, the load bearing layer 10 is advantageously non-metallic.

Further possible embodiments of the load bearing layer 10 are shown in FIGS. 8 to 11.

Figure 3:
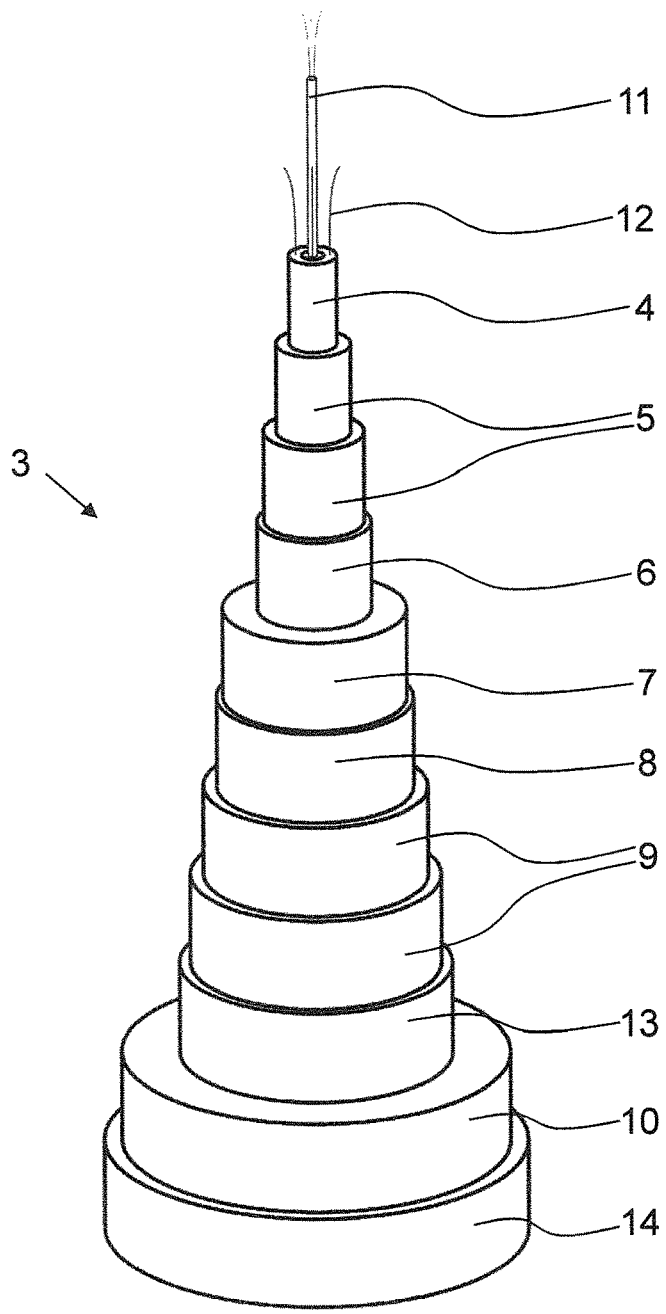
FIG. 3 shows the construction of a second embodiment of an inventive electric energy transmission tether, in a perspective view.

FIG. 3 shows a second embodiment of an inventive electric energy transmission tether 3 for an airborne wind power station 1. Elements with an identical or similar function are annotated with the same reference numerals throughout FIGS. 1 to 13.

Among other things, the embodiment as shown in FIG. 3 differs from the embodiment of FIG. 2 by comprising a fibre optic cable 11. The fibre optic cable 11 extends within the elastic core 4 along the entire longitudinal length of the tether 3 and serves for data communication between the ground station 2 and the wind power station 1. For example, control signals for controlling the flight movements of the wind power station 1 or status or sensor signals can be transmitted by means of the fibre optic cable 11. The use of the airborne wind power station 1 as a station for the transmission of electromagnetic radio signals for civil or military applications can also be implemented by the help of the fibre optic cable 11 and suitable receiving and transmitting antennas located on the airborne wind power station 1. Depending on the local wind situation, the system can be implemented as fully or partially self-supplying. The fibre optic cable 11 is arranged in the centre of the elastic core 4 which has a hollow or cylindrical design here and, thus, coincides with the longitudinal centre axis of the tether 3.

In the embodiment of FIG. 3, two adjacent sublayers are provided for the metallic wires 5 as well as for the metallic wires 9. The two sublayers of metallic wires 5 and 9 can in each case for example be characterized by the direction in which the respective metallic wires 5 or 9 are wound around the longitudinal centre axis of the tether 3. For example, the metallic wires 5 of the first, inner sublayer can be wound in a clockwise direction around the elastic core 4 and the metallic wires 5 of the adjacent second, outer sublayer can be wound in the opposite, counter clockwise direction, in order to symmetrically equalize the mechanical characteristics of the tether 3. In general, further sublayers for the layers of metallic wires 5 and 9 can be provided.

Within the elastic core 4, elastic or non-elastic strands 12 can be provided along the longitudinal direction of the tether 3. If the strands are non-elastic, they are provided for production purposes only and are intended to rupture during the first use of the tether 3.

In the embodiment as shown in FIG. 3, a slip layer 13 is provided between the second, outer layer of metallic wires 9 and the load bearing layer 10. The slip layer 13 serves to provide the possibility of low friction gliding between the load bearing layer 10 and the outer layer of metallic wires 9. In the current embodiment, the slip layer 13 also has the function of a moisture barrier, in order to prevent moisture to reach the metallic wires 5 and 9 and especially the electrical insulation layer 7 which could suffer from a degradation of its electric insulating capability due to moisture. Of course, the slip layer 13 could also be moisture permeable, and an additional humidity blocking layer could be provided, being positioned between the slip layer 13 and the outer layer of metallic wires 9. If no low-friction slip of the load bearing layer 10 on the metallic wires 9 is needed, layer 13 could also be a humidity blocking layer without having any gliding function.

In the embodiment of FIG. 3, a wear protection layer 14 is arranged as the outermost layer on the outer side of the load bearing layer 10, in order to protect the load bearing layer 10 e.g. against mechanical friction when being wound up on the drum 15 or against moisture, sunlight or certain acids being present in the air. In order to reduce the wind resistance of the tether 3, the wear protection layer 14 can be implemented with a surface covered with small spherical dents with a size in the millimeter range, similar to a golf ball surface. The wear protection layer 14 can further comprise a braid of strands, e.g. of high tensile strands made of e.g. aramide, with a helical pitch angle in the range of +/−40° to +/−60° to reinforce the wear protection layer 14 and prevent a peeling of the wear protection layer 14 when being locally degraded.

Figure 4:
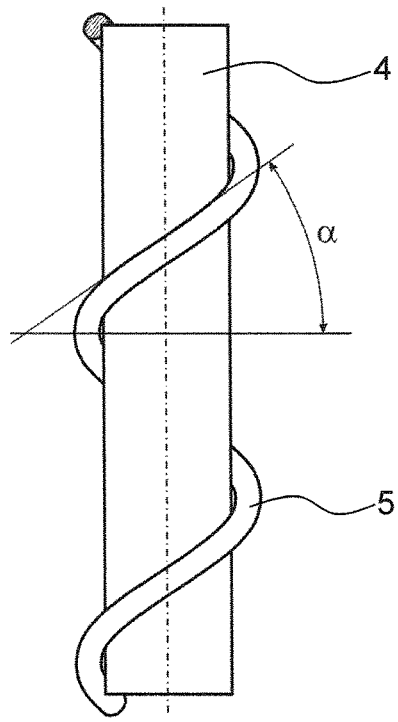
FIG. 4 shows a side view of the elastic core and a helically wound electric conductor of the tether as shown in FIG. 2 or 3.

FIG. 4 illustrates how the metallic wires 5 of the first layer of electric conductors are helically wound around the elastic core 4 in the embodiments shown in FIGS. 2 and 3. The metallic wires 9 of the second layer of electric conductors can be wound around the insulation layer 7 accordingly. The metallic wires 5 (or 9) form a helix with a helical pitch angle $\alpha$. In the embodiments as shown in FIGS. 2 and 3, the helical pitch angle $\alpha$ of the metallic wires 5 and 9 is preferably in the region between 25° and 45°, in particular between 30° and 40°. The use of such a helical pitch angle $\alpha$ for the metallic wires 5 and 9 leads to an essentially equal radial contraction of the metallic wires 5 and 9 as well as of the elastic core 4 and of the insulation layer 7 under axial elongation or compression induced by high tensile loads or spooling operations of the tether 3.

Figure 5:
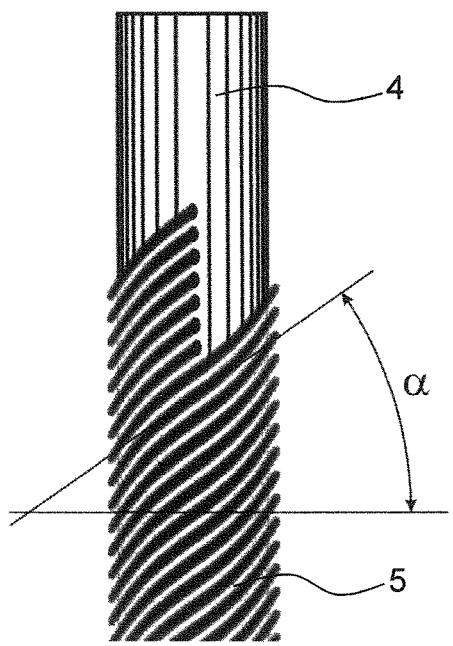
FIG. 5 shows a side view of the elastic core and a plurality of helically wound electric conductors of the tether as shown in FIG. 2 or 3.

Preferably, as shown in FIG. 5, a plurality of closely wound metallic wires is provided both in the first layer of metallic wires 5 and in the second layer of metallic wires 9.

Figure 6:
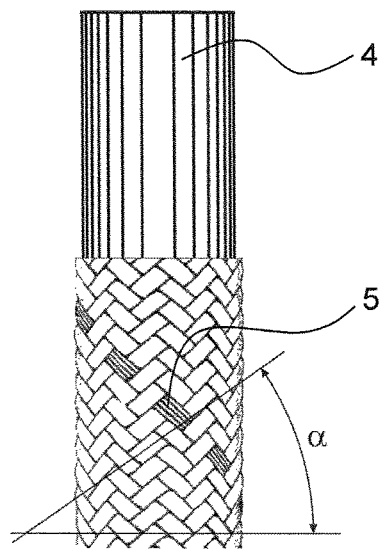
FIG. 6 shows a side view of the elastic core and a plurality of helically wound and braided electric conductors of the tether as shown in FIG. 2 or 3.

In a particularly preferred embodiment, both the first layer of electric conductors 5 as well as the second layer of electric conductors 9 is provided in the form of electric wires being braided with each other. As seen in FIG. 6, all metallic wires 5 (or 9) of the first layer of electric conductors 5 (and of the second layer of electric conductors 9, respectively) are helically wound around the elastic core 4 with the same helical pitch angle $\alpha$ that is in the region between 25° and 45° (between −25° and −45°), in particular between 30° and 40° (between −30° and −40°).

The metallic wires 5 and 9 are helically wound around the longitudinal centre axis of the tether 3, in order to prevent plastic deformation of the highly inelastic conductor material, such as copper. However, it has been recognized that the pitch angle of the helices formed by the metallic wires 5 and 9 is crucial, in order to avoid a damage of the tether 3 under high tensile loads or when being bent around drum 15 for example. Therefore, the following calculations are presented for optimizing the helical pitch angle $\alpha$ in the case of a metallic wire 5 being helically wound around an elastic core 4 (situation as shown in FIG. 4):

The relative change in length $\varepsilon$ of the elastic core 4 leads to a radial contraction. The calculation of the radial contraction coefficient $\rho_1$ of the elastic core 4 is given as follows:

$$\rho_1 = \sqrt{\frac{1}{1+\varepsilon}}$$

The relative change in length $\varepsilon$ of the helix leads to a radial contraction of the metallic wire 5, which is depending on the pitch angle $\alpha$. The radial contraction coefficient $\rho_2$ of the helix can be calculated as follows:

$$\rho_2 = \frac{\sqrt{1-((1+\varepsilon)\sin\alpha)^2}}{\cos\alpha}$$

The behaviour of the helix formed by the metallic wire 5 in relation to the elastic core 4 under axial strain can be subdivided into the following cases:
I. $\rho_1 < \rho_2$: The helix formed by wire 5 lifts off from the elastic core 4.
II. $\rho_1 = \rho_2$: The helix formed by wire 5 moves synchronously with the elastic core 4.
III. $\rho_1 > \rho_2$: The helix formed by wire 5 is pressed into the elastic core 4.

In case I, layers that are radially arranged outside of the metallic wire 5, such as the insulation layer 7, limit the lift-off of the helix from the elastic core 4. The metallic wires 5 are therefore exposed to compression strain and buckling of the metallic wires 5 is very likely to occur, which will eventually lead to failure of the electric energy transmission capabilities of the tether 3.

In case III, it is not possible for the helix of the metallic wires 5 to penetrate the surface of the elastic core 4, if the elastic core 4 is modelled, in a first approach, as being incompressible. As a result, elongation in combination with plastic deformation of the metallic wires 5 will occur. When being forced to move back to the neutral position in the case of no axial tension ($\varepsilon=0$), the elongated metallic wires 5 will buckle.

In case II, the equal radial contraction leads to a minimal mechanical stress of the metallic wires 5 and of the elastic core 4.

The optimal pitch angle $\alpha$ at which case II is fulfilled can be calculated as follows:

$$\Delta\rho_{radial} := \rho_1 - \rho_2 = \sqrt{\frac{1}{1+\varepsilon}} - \frac{\sqrt{1-((1+\varepsilon)\sin\alpha)^2}}{\cos\alpha} = 0$$

Figure 7:
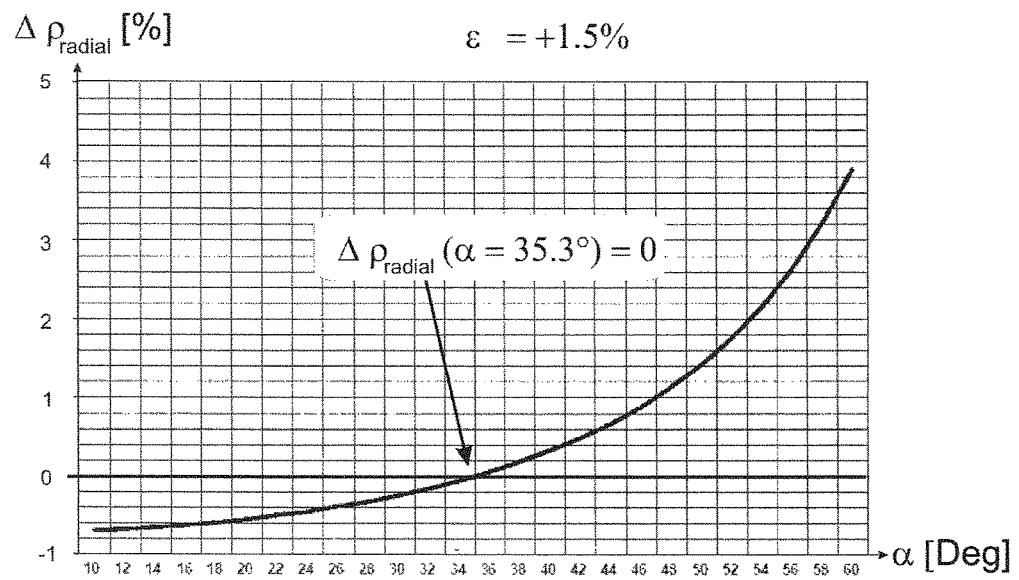
FIG. 7 shows a diagram illustrating the difference of radial contraction between a helical wire and an elastic core ($\Delta\rho_{radial}$) in dependence on the helical pitch angle $\alpha$ of the wire, for an axial extension $\varepsilon$ of +1.5% of the entire tether.

The graphical illustration of this equation for finding the optimal pitch angle $\alpha$ is illustrated in FIG. 7 for the situation of an axial elongation $\varepsilon=1.5\%$.

This calculation of the optimal pitch angle $\alpha$ results in:

$$\alpha = \arcsin\left(\sqrt{\left|\frac{\varepsilon}{1-(1+\varepsilon)^3}\right|}\right)$$

Thus, for an axial elongation $\varepsilon$ of +1.5% of the entire tether 3 an optimal pitch angle $\alpha_1$ of the helix formed by the metallic wire 5 of 34.96° is obtained. In case of winding up the tether 3 on the drum 15, the parts of the tether 3 facing the centre of the drum 15 get compressed. For a compression of $\varepsilon$ of −1.5% of e.g. the metallic wires 5 an optimal pitch angle $\alpha_2$ of 35.57° is obtained. Applying the average value of $(\alpha_1+\alpha_2)/2=\alpha_{opt}$ of 35.265°, rounded to 35.3° for both load cases (elongation and compression), the difference of approx. 0.3° to the exact values of $\alpha_1$ and $\alpha_2$ will lay within the production tolerances. Please note that the calculations above are also applicable for the helix formed by metallic wires 9 wound around the insulation layer 7.

Experiments have shown that the tether 3 for the airborne wind power station 1 should be chosen such that the elongation $\varepsilon$ along its longitudinal direction is below 5%, more preferred below 3%, for the maximal tensile load to be expected. A certain elasticity is required to better absorb the tensile forces acting on the tether 3. If, however, the tether 3 is elongated by more than 3%, or even more than 5%, there is a risk that the insulation layer 7 will degrade. Experiments with the typical insulation material polyethylene showed that the electric insulation capability is beginning to decrease due to the degradation of the insulation material at repetitive strain rates above 5%. A theoretical optimal pitch angle $\alpha$ of 35.3° with a variation of only +/−0.3° of the electric conductors for the range of possible elongations $\varepsilon$ of the tether 3 can be observed. For the practical implementation of the helically wound metallic wires 5 and 9, the part to be optimised is, among other things, the conductivity in axial direction on the basis of given strain and fatigue cycle rate. As a consequence, the optimal pitch angle has a wider variation range. Thus, the metallic wires 5 and 9 are preferably wound around the longitudinal centre axis of the tether 3 at a pitch angle of 25° to 45°, more preferably of 30° to 40°, and most preferably of about 35°.

Figure 8:
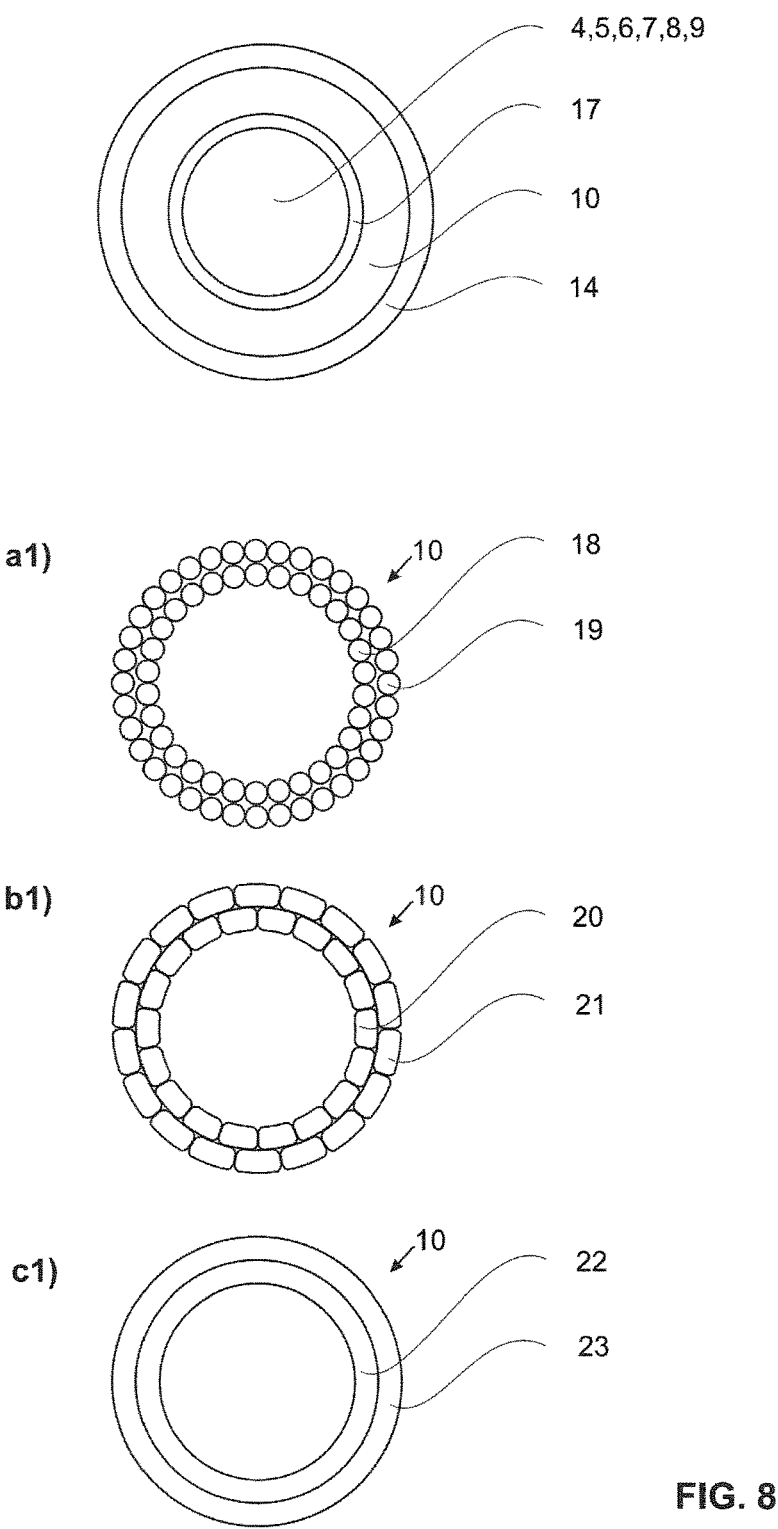
FIG. 8 shows a cross section of a third embodiment of an inventive electric energy transmission tether with different possible embodiments of the load bearing layer shown in a1), b1) and c1)

FIG. 8 shows a cross section of the tether 3 which illustrates different possible constructions of the load bearing layer 10 in combination with an elastic buffer layer 17 for equalization of radial compressive forces towards a possible embodiment of an electric transmission system 4, 5, 6, 7, 8, 9 caused by radial contraction of the load bearing layer 10 under tensile load.

The load bearing layer 10 can be implemented as shown in subfigure a1) in the form of two layers of circularly arranged tensile armour elements 18, 19. These tensile armour elements are helically arranged around the longitudinal axis of the tether 3 with a pitch angle in the range of +/−65° to +/−85°. They can be made of a composite material, e.g. of pulltruded carbon fibre wires or, if the weight restrictions allow a higher weight, also of e.g. high strength steel. The two layers of tensile armour elements 18, 19 can in each case for example be characterized by the direction in which the respective tensile armour elements are wound around the longitudinal centre axis of the tether 3. For example, the tensile armour elements 18 of the first inner sublayer can be wound in a clockwise direction around the elastic buffer layer 17, and the tensile armour elements 19 of the adjacent second outer sublayer can be wound in the opposite, counter clockwise direction, in order to symmetrically equalize the mechanical characteristics of the tether 3. According to the tensile strength requirements of the tether 3, further sublayers of tensile armour elements can be provided.

Under axial strain of the tether 3, the helically applied tensile armour elements 18, 19 will induce a compressive force to the inner parts of the tether 3. Therefore, an elastic buffer layer 17 consisting of a soft material, for example silicon elastomere, depolymerized rubber or polyurethane, can be applied, in order to homogenize the radial compressive forces on the outermost electric conductor layer 9. This will help to avoid plastic deformation and the danger of buckling and breaking of the electric wires in the electric conductor layer 9.

The load bearing layer 10 can also be implemented as shown in subfigure b1) in the form of two layers of circularly arranged tensile armour profiles 20, 21. The same considerations concerning the arrangement of the tensile armour profiles 20, 21 can be applied as for the tensile armour elements 18, 19. The tensile armour profiles can be made of a composite material, e.g. of pulltruded carbon fibre wires, or, if the weight restrictions allow higher weight, also of e.g. high strength steel.

The load bearing layer 10 can also be implemented as shown in subfigure c1) in the form of two layers of tensile armour composite layer 22, 23. A tensile armour composite layer 22, 23 is made of a composite material with unidirectional fibre orientation. The fibres are helically arranged around the longitudinal axis of the tether 3 with a pitch angle in the range of +/−65° to +/−85°. The same considerations concerning the arrangement in clockwise respective counter clockwise orientation of the tensile armour composite layers can be applied as for the tensile armour elements 18, 19, in order to get symmetrically equalized mechanical characteristics of the tether 3. The tensile armour composite layers 22, 23 can for example be made of carbon, glass or aramid fibres in an epoxy resin or thermoplastic matrix. The tensile armour composite layers 22, 23 can be separated by an additional slip/antifriction layer, in order to achieve a smaller bending radius of the entire tether 3 when spooled on a drum 15.

In order to achieve a sufficient electric power transmission capability in the case of a very large airborne wind power station 1, a large diameter of the tether 3 is required. With the approach according to FIG. 8, the increased axial forces acting on the tether 3, which result in increased radial compression forces, can lead to an increased degradation of the electric conductors.

Figure 9:
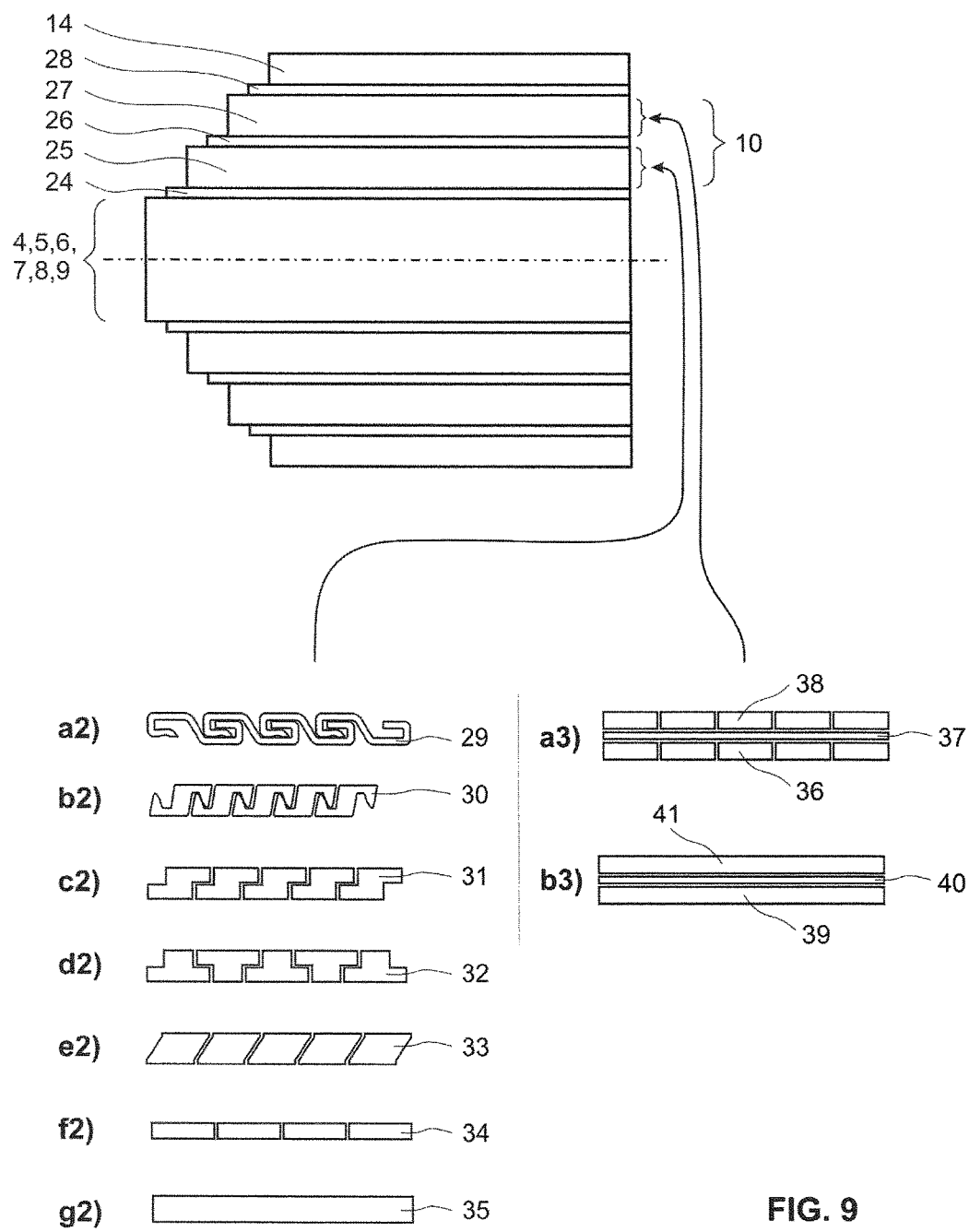
FIG. 9 shows an axial cut of a fourth embodiment of an inventive electric energy transmission tether with different possible embodiments of the load bearing layer comprising an inner compression resistant layer as shown in a2), b2), c2), d2), e2), f2), g2), a slip/antifriction layer and different possible embodiments of an outer tensile armour layer as shown in a3), b3)

In FIG. 9, a further implementation of the inventive electric energy transmission tether 3 is shown, optimizing its bending radius limits towards the high tensile load requirements by adding a compression resistant layer 25 together with additional slip/antifriction layers 24, 26, 28, 37, 40 and therefore featuring an increased protection of the electric system 4, 5, 6, 7, 8, 9.

The load bearing layer 10 is subdivided in a compression resistant layer 25, a slip/antifriction layer 26 and a tensile armour layer 27. Between the load bearing layer 10 and the electric system 4, 5, 6, 7, 8, 9 preferably a slip/antifriction layer 24 is implemented. Also between the load bearing layer 10 and the wear protection layer 14, a slip/antifriction layer 28 can be implemented. These slip/antifriction layers 24, 26, 28 help to enable a small bending radius of the entire tether 3 due to the unbonded state of the different layers. The slip/antifriction layers 24, 26, 28 can for example consist of a thermoplastic material like nylon 11 (PA11) or fluoropolymers like polytetrafluorethylene (PTFE).

The compression resistant layer 25 can be implemented as shown in subfigure a2) in the form of an s-shaped interlocked compression resistant layer 29, also called carcass. The individual elongated elements with the s-shaped profile used in the s-shaped interlocked compression resistant layer 29 are helically arranged around the longitudinal axis of the tether 3 with a pitch angle in the range of 1° to 20°, more preferably in the range of 5° to 10°. Depending on the helical pitch angle of the s-shaped interlocked compression resistant layer 29 and the width of the s-shaped profile of the s-shaped interlocked compression resistant layer 29, the compression resistant layer 25 can comprise more than one helically applied s-shaped profile of the s-shaped interlocked compression resistant layer 29. They can be made of a composite material, e.g. of pulltruded carbon fibre or, if the weight restrictions allow higher weight, also of e.g. high strength steel.

A further embodiment of the compression resistant layer 25 is shown in b2) in the form of a z-shaped interlocked compression resistant layer 30, also called hoop strength layer. The same arrangement considerations can also be applied for the z-shaped interlocked compression resistant layer 30 as for the s-shaped interlocked compression resistant layer 29. The z-shaped interlocked compression resistant layer 30 can consist of a composite material, e.g. of pulltruded carbon fibre or, if the weight restrictions allow a higher weight, also of e.g. high strength steel.

Further shapes of embodiments of the compression resistant layer 25 are shown in c2): A z-shaped compression resistant layer 31; and in d2): a T-shaped compression resistant layer 32, and in e2): a slanted compression resistant layer 33; and in f2): a flat compression resistant layer 34. In difference to the compression resistant layers 29 and 30, these layers are not interlocked, but feature a simpler cross-sectional profile, easier to produce. The same arrangement considerations can also be applied for the embodiments 31, 32, 33, 34 of the compression resistant layers 25, as for the s-shaped interlocked compression resistant layer 29. The embodiments 31, 32, 33, 34 of the compression resistant layers 25 can be made of a composite material, e.g. of pulltruded carbon fibre or, if the weight restrictions allow a higher weight, also of e.g. high strength steel.

A further possibility of an embodiment of the compression resistant layer 25 is shown in g2): A composite compression resistant layer 35 being made of a composite material with unidirectional fibre orientation. The fibres are helically arranged around the longitudinal axis of the tether 3 with a pitch angle in the range of 1° to 20°, more preferably in the range of 5° to 10°. The composite compression resistant layer 35 can for example be made of carbon, glass or aramid fibres in an epoxy resin or thermoplastic matrix.

The tensile armour layer 27 can be implemented as shown in subfigure a3) in the form of two layers of helically arranged tensile armour elements 36, 38 separated from each other by a slip/antifriction layer 37. These tensile armour elements 36, 38 are helically arranged around the longitudinal axis of the tether 3 with a pitch angle in the range of +/−35 to +/−65°. They can be made of a composite material, e.g. of pulltruded carbon fibre wires or, if the weight restrictions allow a higher weight, also of e.g. high strength steel. The two layers of tensile armour elements 36, 38 can in each case for example be characterized by the direction in which the respective tensile armour elements are wound around the longitudinal centre axis of the tether 3. For example, the tensile armour elements 36 of the first inner sublayer can be wound in a clockwise direction around the slip/antifriction layer 26, and the tensile armour elements 38 of the adjacent second outer sublayer can be wound around the slip/antifriction layer 37 in the opposite, counter clockwise direction, in order to symmetrically equalize the mechanical characteristics of the tether 3. According to the tensile strength requirements of the tether, further sublayers of tensile armour elements can be provided. The slip/antifriction layer 37 can for example be made of a thermoplastic material like nylon 11 (PA11) or fluoropolymers like polytetrafluorethylene (PTFE).

The tensile armour layer 27 can also be implemented as shown in subfigure b3) in the form of two layers of tensile armour composite layers 39, 41, which can be separated from each other by a slip/antifriction layer 40. The tensile armour composite layers 39, 41 are made of a composite material with unidirectional fibre orientation. The fibres are helically arranged around the longitudinal axis of the tether with a pitch angle in the range of +/−35° to +/−65°. The same arrangement considerations concerning clockwise respective counter clockwise orientation can also be applied for the tensile armour composite layers 39, 41 as for the tensile armour elements 36, 38, in order to get symmetrically equalized mechanical characteristics of the tether 3. The tensile armour composite layers 39, 41 can for example be made of carbon, glass or aramid fibres in an epoxy resin or thermoplastic matrix. The slip/antifriction layer 40 can for example be made of a thermoplastic material like nylon 11 (PA11) or fluoropolymers like polytetrafluorethylene (PTFE).

In a further embodiment, the tensile armour layer 27 can be realized by means of a chemical fibre rope. The chemical fibre rope can for example be made of aramid, Dyneema®, Vectran® or Zylon® and is typically spirally braided. The chemical fibre rope can be irreversibly stretched for example when being applied on the compression resistant layer 25.

Figure 10:
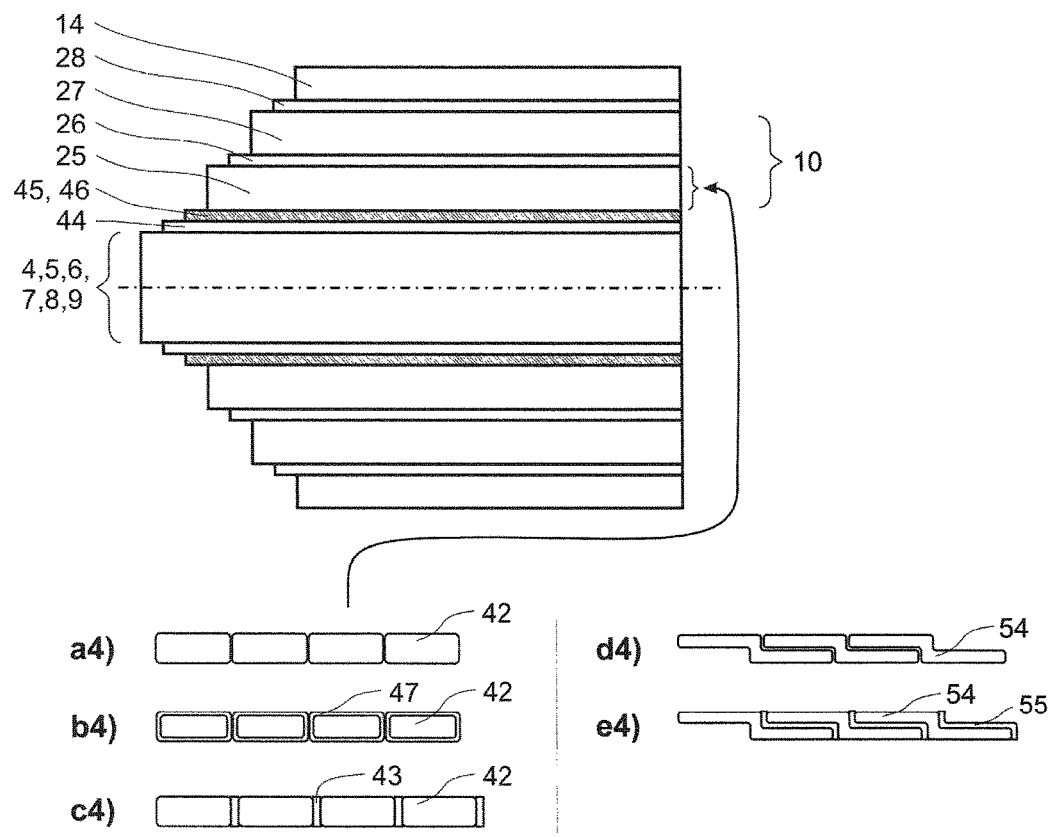
FIG. 10 shows an axial cut of a fifth embodiment of an inventive electric energy transmission tether with different possible embodiments of the load bearing layer comprising an inner compression resistant layer as shown in a4), b4), c4), d4), e4) and an outer tensile armour layer and comprising an electric system with a conductor protection layer and/or one or more buffer layers.
Figure 11:
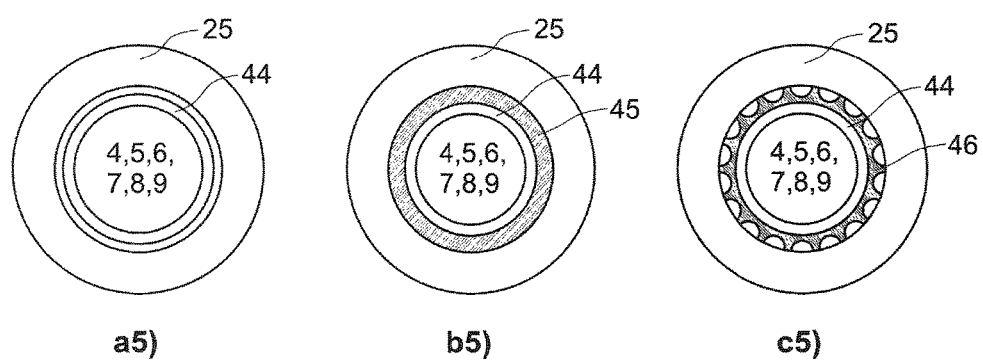
FIG. 11 shows a cross section of the tether as shown in FIG. 10 with different possible embodiments of the conductor protection layer and of the buffer layer in a5), b5) and c5)

In FIGS. 10 and 11, further possible embodiments of the electric energy transmission tether 3 according to the invention are shown. In these embodiments, which can of course be combined with the embodiments as shown in FIGS. 1 to 9, the electric system of the tether 3 comprises a conductor protection layer 44 and/or one or more buffer layers 45, 46. The load bearing layer 10 comprises an inner compression resistant layer 25, an outer tensile armour layer 27 and a slip/antifriction layer 26 being interposed between the compression resistant layer 25 and the tensile armour layer 27.

The compression resistant layer 25 can for example be realized in the form as shown in subfigure a4) by means of ring-shaped compression resistant elements 42. The ring-shaped compression resistant elements 42 are arranged around the inner layers 4-9 and, if provided, the layers 44-46. The ring-shaped compression elements 42 are preferably made of a ceramic, metallic or a fibre reinforced material. If made of a fibre reinforced material, the matrix can for example be a thermoset or a thermoplastic material.

In the embodiment as shown in subfigure b4), each of the ring-shaped compression resistant elements 42 comprises a coating 47. The coating 47 which preferably completely coats the surface of the ring-shaped compression resistant elements 42 can for example be made of a metal, in order to improve the protection of the tether 3 against lightning. Alternatively, the coating 47 can be made of a particularly wear resistant material, in order to prolong the life time of the tether 3.

In the embodiment as shown in subfigure c4), ring-shaped axial buffer elements 43 are arranged between each of two adjacent ring-shaped compression resistant elements 42. The ring-shaped axial buffer elements 43 which can for example be made of polyurethane or of a silicone-elastomer serve to reduce local stress acting on the ring-shaped compression resistant elements 42. Local stress acting on the ring-shaped compression resistant elements 42 can particularly occur when bending the tether 3 on a drum, such as drum 15 shown in FIG. 1. The ring-shaped compression resistant elements 42 of this embodiment may or may not comprise the coating 47. If a coating 47 made of a metal is present for protecting the tether 3 against lightning and against electrostatic charging, the ring-shaped axial buffer elements 43 can also be made of an electrically conducting material, e.g. a conducting elastomer.

The compression resistant layer 25 can also be realized in the form as shown in subfigure d4) by means of ring-shaped stepped compression resistant elements 54. The ring-shaped stepped compression resistant elements 54 are arranged around the inner layers 4-9 and, if provided, the layers 44-46. The ring-shaped stepped compression resistant elements 54 are preferably made of a metallic, ceramic or a fibre reinforced material. If made of a fibre reinforced material, the matrix can for example be a thermoset or a thermoplastic material. If made of an electrically non-conductive material, a metallic coating can be applied. If made of a metallic material, for example high strength steel or titan alloy can be used. Also high strength metal alloys with high conductivity like beryllium copper can be used, in order to have an additional electric conducting layer for lightning protection or to carry a part of the current which is flowing through the electric conductors 9 or respectively through the outermost layer of electric conductor wires.

In the embodiment as shown in subfigure e4), ring-shaped stepped axial buffer/contact elements 55 are arranged between each of two adjacent ring-shaped stepped compression resistant elements 54. The ring-shaped stepped axial buffer/contact elements 55 which can for example be made of polyurethane or of a silicone-elastomer serve to reduce local stress acting on the ring-shaped stepped compression resistant elements 54 similar to the ring-shaped axial buffer element 43 of the embodiment shown in subfigure c4). If the compression resistant layer 25 is meant to be conductive, the ring-shaped stepped axial buffer/contact elements 55 can be made of an electrically conductive material like a beryllium copper or like semiconducting thermoplasts or elastomers, in order to achieve an electric contact between adjacent electric conductive ring-shaped stepped compression resistant elements 54.

The conductor protection layer 44 serves to protect the electric system, i.e. the metallic wires of the electric conductors 5 and 9 as well as the insulation layer 7 and the semi-conductive layers 6 and 9, from humidity, compression, friction and/or wear. The conductor protection layer 44 may or may not be provided in the form of simply a void space between the adjacent layers.

As shown in the embodiment illustrated in subfigure a5), the conductor protection layer 44 can be present without any buffer layers 45, 46. In this case, the conductor protection layer 44 can be adapted to provide high static friction, in order to prevent a relative slip between the conductor protection layer 44 and the compression resistant layer 25. Between the conductor protection layer 44 and the compression resistant layer 25 an annular gap can be provided, such that the conductor protection layer 44 is loose with respect to the compression resistant layer 25, when the tether 3 is in its unloaded condition. The provision of such a gap can for example be important for the application of the compression resistant layer 25 on layers 4-9 and 44 during the production of the tether 3, particularly if the conductor protection layer 44 is incompressible.

In the embodiment as shown in subfigure b5), a single buffer layer 45 is provided between the conductor protection layer 44 and the compression resistant layer 25. The buffer layer 45 which fills out the space between the conductor protection layer 44 and the compression resistant layer 25 can be made of a foam-based elastomer or of a thermoplastic material having a high elasticity. The buffer layer 45 can be pre-squeezed during production of the tether 3, in order to also fill out the space between the conductor protection layer 44 and the compression resistant layer 25, when the tether 3 is under tension and, as a consequence, radially compressed. Additionally or alternatively, the buffer layer 45 can be adapted to provide high static friction, in order to prevent a relative slip between the conductor protection layer 44 and the compression resistant layer 25 in particular at the upper end of the tether 3, and therefore to prevent local axial stress to the electric system.

In the embodiment as shown in subfigure c5), a single buffer layer 46 is provided which comprises a grip surface.

The grip surface which is directed radially outwards towards the compression resistant layer 25 is realized by means of axial ribs extending along the entire longitudinal direction of the tether 3. Due to its grip surface, the buffer layer 46 centres the electric system 5-9 with the conductor protection layer 44 in an elastic way within the compression resistant layer 25. In order to compensate for the reduction in diameter of the electric system when being axially stretched, the buffer layer 46 can be pre-tensioned correspondingly. Due to the void spaces being provided in circumferential direction between the ribs of the grip surface, the elastic material of the buffer layer 46 is allowed to expand and contract. Here, the void spaces between the ribs have the shape of a semi-circle in cross-section view, but of course other shapes of these void spaces are also conceivable. The buffer layer 46 can be made of an elastomer, a silicone-elastomer or of a rubber material with high elasticity.

Figure 12:
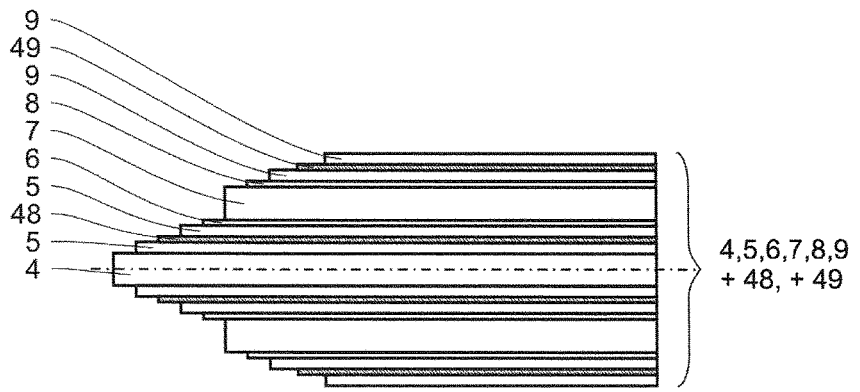
FIG. 12 shows an axial cut of a sixth embodiment of an inventive electric energy transmission tether in which each of the two layers of electric conductors comprises two sublayers between each of which a slip/antifriction layer is provided.

In FIG. 12, a further embodiment of an electric energy transmission tether 3 according to the invention is shown. For the sake of simplicity, only the inner layers of the tether 3 up to the layer of electric conductors 9 are illustrated in FIG. 12. At least a further layer in the form of the load bearing layer 10 is present. Other layers, such as a buffer layer 45 or 46, a conductor protection layer 44, a humidity blocking layer 13, a wear protection layer 14 and/or slip/antifriction layers 26, 28 can additionally be provided.

In the embodiment according to FIG. 12, each of the layers of electric conductors 5, 9 comprises two sublayers of metallic wires. Between the two sublayers in each case a slip/antifriction layer 48, 49 is provided, in order to reduce wear and fretting between the metallic wires of the adjacent sublayers and to increase the life time of the tether 3 in view of the high number of fatigue cycles. The slip/antifriction layer 48, 49 can for example be made of polytetrafluoroethylene (PTFE), nylon, a thermoplastic material or Mylar®.

Figure 13:
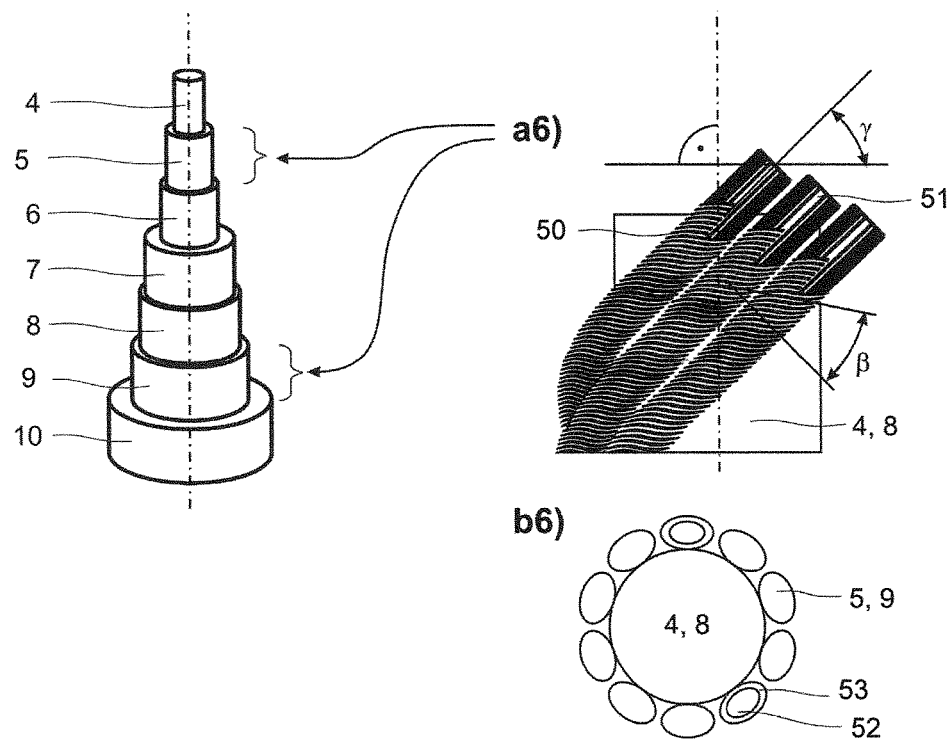
FIG. 13 shows the construction of a seventh embodiment of an inventive electric energy transmission tether in a perspective view, with different possible embodiments of the layers of electric conductors as shown in a6) and b6).

FIG. 13 shows an embodiment of an inventive electric energy transmission tether 3, in which further possibilities of providing and arranging the electric conductors 5 and 9 are provided. As in previous embodiments, the layers of the electric conductors 5 and 9 are arranged between the elastic core 4 and the semi-conductive layer 6 and between the semi-conductive layer 8 and the load bearing layer 10, respectively.

According to subfigure a6), each of the electric conductors 5 and 9 can comprise metallic wires 50 which are helically wound around a single or, as shown in subfigure a6), multiple elastic cores 51 with a pitch angle $\beta$ of between 15° and 60°. The elastic cores 51 themselves are helically wound around the central elastic core 4 with a pitch angle $\gamma$ of between 30° and 60°. With an arrangement of the metallic wires 50 of the electric conductors 5, 9 as shown in subfigure a6) the stress acting on the metallic wires 50 can be decreased, in order to achieve an increased life time of the tether 3.

Subfigure b6) shows an embodiment in which each of the layers of electric conductors 5, 9 comprises metallic wires 52 that are helically wound around the longitudinal axis of the tether 3 with a pitch angle $\alpha$ and that are coated with an antifriction/insulating coating 53. One, several or all metallic wires 52 of each layer of electric conductors 5, 9 can be coated. The antifriction property of the coating 53 serves to increase the life time of the electric conductors 5, 9 which are usually exposed to repeated friction. The electric insulating property which can be present alternatively or in addition to the antifriction property serves to detect wire breakage and helps to determine the end of service life time of the tether 3. The wire breakage can be detected by measuring the electric resistance of one of the insulated wires 52. When one of the wires 52 breaks, the electric resistance of the respective wire increases significantly. In cases, in which the wires of one layer of electric conductors 5, 9 are not insulated against each other, the inter-wire-conductivity leads to hardly detectable changes in the resistance of the wires. However, in these cases high tensile loads acting on the tether 3 can easily lead to a partial or complete electric interruption in one of the layers of electric conductors 5, 9 along the longitudinal direction of the tether 3. In this case an electric arc or a sudden high increase of the temperature at the electrically weakened part can evolve and destroy the tether 3. The material of the antifriction/insulating coating 53 can be for example PTFE, a thermoplastic material, Fluorinated ethylene propylene (Teflon® FEP), Mylar® or varnish.

The invention is of course not limited to the preceding presented embodiments and a plurality of modifications is possible. It is for example possible for the tether 3 to have additional layers which have not been mentioned here. The fibre optic cable 11 or any other data communication cables could for example be arranged in a further layer specifically dedicated for data communication instead of being provided within the elastic core 4. The fibre optic cables can also be arranged helically with an optimal pitch angle of 25° to 45°, more preferably with a pitch angle in the range of 30° to 40°. It would also be possible to have additional electrically conductive layers with metallic wires. For example, a third conductive layer of metallic wires could be provided to allow three-phase electric power with a Delta-configuration to be transmitted by the tether or even a third and a fourth conductive layer of metallic wires could be provided to allow three-phase electric power with a Y-configuration to be transmitted by the tether. The radially outermost conductive layer could be adapted for lightning protection. Of course it is also conceivable to have, in addition to the first and the second conductive layers of metallic wires 5 and 9, a separate conductive layer specifically adapted for lightning protection, which would in this case preferably be arranged outside of the first and second conductive layers and be advantageously isolated against these layers by means of a high temperature thermoplastic material, such as Teflon®. Preferred, however, due to weight constraints are the embodiments as shown in FIGS. 2 and 3, in which the tether 3 only comprises the layers as shown in these figures, without any additional layers. The ground station 2 could optionally comprise a device for absorbing the tensile forces of the tether 3 before being wound on the drum 15, in order to avoid that the tensile load caused by the wind power station 1 acts on the drum 15. Furthermore, an additional buffer layer can be provided between the second layer of metallic wires 9 and the slip layer 13, in order to allow different radial contractions of the load bearing layer 10 and the second layer of metallic wires 9, without harming the tether 3. The buffer layer can for example comprise a foam material, such as foam rubber made of e.g. neoprene, butyl, nitrile rubber or silicone rubber. A plurality of further modifications is possible.

The invention claimed is:

1. An electric energy transmission tether for an airborne wind power station, comprising
    an elastic core;
    a first layer of one or more electric conductors helically wound around the elastic core;
    an electric insulation layer surrounding the first layer of one or more electric conductors;

a second layer of one or more electric conductors helically wound around the electric insulation layer;

a load bearing layer comprising a tensile armor layer for absorbing tensile forces acting on the tether and a compression resistant layer for absorbing radial compression forces acting on the tether, the load bearing layer surrounding the second layer of one or more electric conductors and defining a maximal elongation of the tether under a maximally to be expected tensile load; and a first semi-conductive layer arranged between the first layer of one or more electric conductors and the electric insulation layer.

2. The tether as claimed in claim 1, wherein the load bearing layer is reinforced with elongated elements.

3. The tether as claimed in claim 2, wherein the elongated elements are helically wound around the second layer of one or more electric conductors.

4. The tether as claimed in claim 1, wherein the load bearing layer comprises a slip/antifriction layer being arranged between the compression resistant layer and the tensile armour layer.

5. The tether as claimed in claim 1, wherein the electric conductors of the first layer of one or more electric conductors and/or the electric conductors of the second layer of one or more electric conductors are wound with a helical pitch angle in a region between 25° and 45°.

6. The tether as claimed in claim 1, wherein the first layer of one or more electric conductors and/or the second layer of one or more electric conductors are formed by braided wires.

7. The tether as claimed in claim 1, wherein the first layer of one or more electric conductors and/or the second layer of one or more electric conductors each comprise several adjacent sublayers of helically wound wires, the wires of the adjacent sublayers being wound in opposite directions.

8. The tether as claimed in claim 1, wherein, with respect to a longitudinal direction of the tether, the load bearing layer has a tensile stiffness that is greater than an overall effective tensile stiffness of the elastic core, of the first and the second layers of one or more electric conductors and of the electric insulation layer together.

9. The tether as claimed in claim 1, further comprising at least one data transmission cable arranged within the elastic core.

10. The tether as claimed in claim 1, further comprising a second semi-conductive layer arranged between the electric insulation layer and the second layer of one or more electric conductors.

11. The tether as claimed in claim 1, wherein a moisture barrier and/or slip layer is provided between the second layer of one or more electric conductors and the load bearing layer.

12. The tether as claimed in claim 1, wherein a wear protection layer surrounding the load bearing layer is provided.

13. The tether as claimed in claim 1, wherein the load bearing layer is non-metallic.

14. The tether as claimed in claim 2, wherein the elongated elements are fibres.

15. The tether as claimed in claim 5, wherein the electric conductors of the first layer of one or more electric conductors and/or the electric conductors of the second layer of one or more electric conductors are wound with a helical pitch angle in a region between 30° and 40°.

16. The tether as claimed in claim 9, wherein the at least one data transmission cable is a fibre optic cable.

17. A tether unit comprising an electric energy transmission tether for an airborne wind power station and a drum for winding up the tether, the tether comprising:

an elastic core;

a first layer of one or more electric conductors helically wound around the elastic core;

an electric insulation layer surrounding the first layer of one or more electric conductors;

a second layer of one or more electric conductors helically wound around the electric insulation layer;

a load bearing layer comprising a tensile armour layer for absorbing tensile forces acting on the tether and a compression resistant layer for absorbing radial compression forces acting on the tether, the load bearing layer surrounding the second layer of one or more electric conductors and defining the maximal axial elongation of the tether under a maximally to be expected tensile load; and a first semi-conductive layer arranged between the first layer of one or more electric conductors and the electric insulation layer.

18. The tether unit as claimed in claim 17, wherein the tether has a first outer radius and the drum comprises a peripheral surface for accommodating the tether with a second outer radius, and wherein the ratio of the first outer radius relative to the second outer radius is at least 0.3% and not more than 5%.

19. The tether unit as claimed in claim 18, wherein the ratio of the first outer radius relative to the second outer radius is at least 0.5% and not more than 3%.

20. A power unit energy comprising an airborne wind power station, a ground station and at least one electric transmission tether for connecting the airborne wind power station to the ground station both physically and electrically, the tether comprising:

an elastic core;

a first layer of one or more electric conductors helically wound around the elastic core;

an electric insulation layer surrounding the first layer of one or more electric conductors;

a second layer of one or more electric conductors helically wound around the electric insulation layer;

a load bearing layer comprising a tensile armour layer for absorbing tensile forces acting on the tether and a compression resistant layer for absorbing radial compression forces acting on the tether, the load bearing layer surrounding the second layer of one or more electric conductors and defining the maximal axial elongation of the tether under a maximally to be expected tensile load; and a first semi-conductive layer arranged between the first layer of one or more electric conductors and the electric insulation layer.

* * * * *